US012804430B2

(12) United States Patent
Proctor

(10) Patent No.: US 12,804,430 B2
(45) Date of Patent: Nov. 17, 2026

(54) METHODS AND SYSTEMS FOR CHRONIC INCIDENT MITIGATION AND RESOLUTION

(71) Applicant: T-Mobile Innovations LLC, Overland Park, KS (US)

(72) Inventor: Shaun Proctor, Fort Worth, TX (US)

(73) Assignee: T-Mobile Innovations LLC

( * ) Notice: Subject to any disclaimer, the term of this patent is extended or adjusted under 35 U.S.C. 154(b) by 288 days.

(21) Appl. No.: 18/592,526

(22) Filed: Mar. 1, 2024

(65) Prior Publication Data

US 2025/0280309 A1 Sep. 4, 2025

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
None
See application file for complete search history.

(56) References Cited

U.S. PATENT DOCUMENTS 9,367,379 B1 * 6/2016 Burke ................. G06F 11/0793
10,003,508 B1 * 6/2018 Cogan ................. H04L 41/0631
11,252,052 B1 2/2022 Babu Balasubramani et al.
2011/0083043 A1 * 4/2011 Chan ................... G06F 11/0709 714/E11.169
2013/0205007 A1 * 8/2013 Ayachitula ............ G06F 9/5072 709/224
2021/0397497 A1 * 12/2021 Tiwari ................... G06N 20/00
2023/0116748 A1 * 4/2023 Rowe .................. H04L 41/0663 709/224
2023/0396513 A1 12/2023 Veggalam et al.
2024/0160515 A1 * 5/2024 Agrawal ............. G06F 11/0793
2025/0021422 A1 * 1/2025 Anand ................ G06F 11/0793

FOREIGN PATENT DOCUMENTS

EP 4611330 A1 9/2025
WO 20230183001 A1 9/2023

OTHER PUBLICATIONS

Foreign Communication From a Related Counterpart Application, Extended EP Search Report and EP Search Opinion dated Jul. 14, 2025 EP Application No. 25157582.5.

* cited by examiner

*Primary Examiner* — Otis L Thompson, Jr.

(57) ABSTRACT

A method comprises generating an incident report based on an alarm, obtaining a history of prior incident reports associated with the network element, the history of prior incident reports including data associated with a plurality of prior incident reports that were created in response to a plurality of prior alarms triggered at the network element, and each of the prior incident reports comprising a resolution identifier identifying a resolution of a prior incident, determining that the incident is a chronic incident when the history of prior incident reports includes at least a threshold quantity of prior incident reports comprising the resolution identifier identifying that the prior incidents at the network element were resolved based on at least one of a self-clear action or a reset action, and adding a tag to the incident report indicating that the incident report describes the chronic incident.

20 Claims, 7 Drawing Sheets

METHODS AND SYSTEMS FOR CHRONIC INCIDENT MITIGATION AND RESOLUTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix NEs. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a method for managing and resolving chronic incidents occurring in a radio access network of a communication network is disclosed. The method comprises monitoring, by an incident reporting application executing on a computer system of the communication network, an alarm stored at a data store of the communication network, in which the alarm is associated with an incident that has occurred at a network element in the radio access network. The method further comprises generating, by the incident reporting application, an incident report based on the alarm, wherein the incident report indicates data describing the incident that has occurred at the network element, and determining, by the incident reporting application, that the incident is a chronic incident when a history of prior incident reports includes at least a threshold quantity of prior incident reports identifying prior incidents at the network element that were resolved using a reset action, in which the prior incidents reports were generated based on prior alarms similar to the alarm. The method further comprises adding, by the incident reporting application, a tag to the incident report indicating that the incident report describes the chronic incident, determining, by an incident management application executing on the computer system, one or more action items to resolve the chronic incident based on a history of incident resolutions indicating a pattern of resolving prior chronic incidents similar to the incident, adding, by the incident management application, the one or more action items to the incident report, and transmitting, by the incident management application, the incident report to an automated system for performing the reset action on the network element and performing the one or more action items at the network element.

In an embodiment, a communications network implemented in a network comprising a radio access network is disclosed. The communications network comprises an incident reporting application and an incident management application. The incident reporting application executes on a computer system in the communication network, wherein the incident reporting application is configured to generate an incident report based on an alarm indicated in a data store, wherein the alarm is triggered in response to an incident that has occurred at a network element in the radio access network, wherein the incident report indicates data describing the incident that has occurred at the network element, obtain a history of incident reports associated with the network element, wherein the history of prior incident reports includes data associated with a plurality of prior incident reports created based on a plurality of prior alarms triggered at the network element, wherein each of the prior incident reports comprises a resolution identifier identifying a resolution of a prior incident, determine that the incident is a chronic incident when the history of prior incident reports includes at least a threshold quantity of prior incident reports comprising the resolution identifier identifying that the prior incidents at the network element were resolved based on a self-clear, and add a tag to the incident report indicating that the incident report describes the chronic incident when the incident is the chronic incident. The incident management application executes on the computer system and is configured to forward the incident report to a processing entity to perform a reset action on the network element and perform one or more action items to resolve the incident.

In yet another embodiment, a method for managing and resolving chronic incidents occurring in a radio access network of the communication network is disclosed. The method comprises generating, by an incident reporting application executing on a computer system, an incident report based on an alarm, in which the alarm is triggered in response to an incident that has occurred at a network element in the radio access network, and the incident report indicates data describing the incident that has occurred at the network element. The method further comprises obtaining, by the incident reporting application, a history of prior incident reports associated with the network element, in which the history of prior incident reports includes data associated with a plurality of prior incident reports that were created in response to a plurality of prior alarms triggered at the network element, and each of the prior incident reports comprises a resolution identifier identifying a resolution of a prior incident. The method further comprises determining, by the incident reporting application, that the incident is a chronic incident when the history of prior incident reports includes at least a threshold quantity of prior incident reports comprising the resolution identifier identifying that the prior incidents at the network element were resolved based on at least one of a self-clear action or a reset action, adding, by the incident reporting application, a tag to the incident report indicating that the incident report describes the chronic incident when the incident is the chronic incident, and forwarding, by an incident management application executing on the computer system, the incident report to a processing entity to perform the reset action on the network element and perform one or more action items to resolve the incident.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
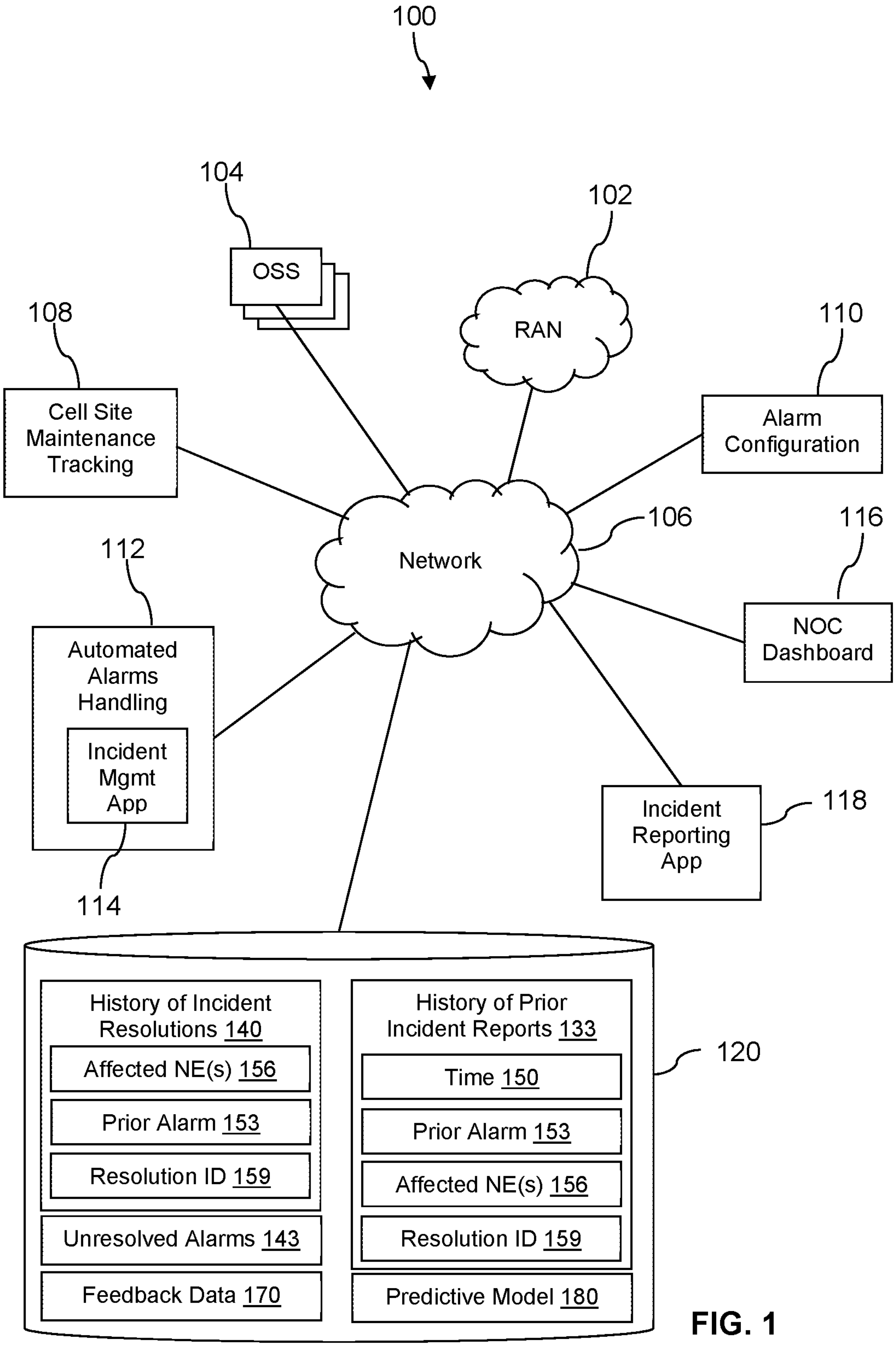
FIG. 1 is a block diagram of a communication network according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communications network may include one or more radio access networks (RANs), each including network elements (NEs) used to transport traffic between a source and destination. The NEs may include, for example, routers, virtual private networks (VPNs), cell sites, towers, macro/micro cells, etc. The communication network may also include an incident reporting system, which may include, for example, one or more OSSs, central monitoring station(s), incident reporting applications, and/or incident management applications, that work together to monitor and resolve hardware and software incidents (e.g., failures and faults) that may occur at the NEs in the system. For example, different types of incidents may occur at each of the NEs, and the different types of incidents may trigger alarms that are forwarded to the OSSs, and then propagated to an incident reporting application. The incident reporting application may be responsible for automatically or manually generating an incident report detailing the incident that caused the alarm. The incident reporting application may create the incident report and send the incident report to an incident management application, which may be responsible for triaging the incident report and ensuring that the incident report is sent to the proper entity for resolution.

For example, cell sites in a RAN may be susceptible to different types of incidents caused by hardware and software failures, which may impact the overall performance and capacity of the network. Hardware failures may include, for example, circuit card failures, antenna failures, power supply failures, backhaul link failures, cable failures, temperature related failures, etc. Software failures may include, for example, firmware bugs, software configuration errors, database corruption, software update issues, security vulnerabilities, protocol stack failures, etc. The NEs in the RAN, or an application communicatively coupled to the NEs, may be programmed to detect these incidents or conditions leading up to these incidents and trigger an alarm accordingly. The incident reporting application may generate the incident report in response to receiving the alarm based on the incident that triggered the alarm. The incident management application may forward the incident report to a processing entity, such as, for example, an automated system, a NOC operator, or a field technician for resolution. As used herein, the term resolution may refer to the process of correcting the underlying incident that triggered the alarm and closing the incident.

In some cases, an NE may trigger multiple, repetitive alarms based on an ongoing incident (or multiple similar incidents) that is not properly resolved. An incident may be considered not properly resolved when a corrective action was taken to address the incident (e.g., turn off the corresponding alarm), but the corrective action only temporarily resolved the incident. The underlying root cause of the incident may not have been properly addressed or resolved. There may be certain types of corrective actions that, when applied to an incident, may often result in an improper or temporary resolution of the incident. These types of resolutions may include, for example, a reset of the NE and a self-clear of the NE. The reset of the NE may encompass various types of resets that may be performed at the NE. For example, the reset may be a simple reboot of the NE, a hardware restart of the NE, a software restart at the NE, a complete hardware reset at the NE, a complete software reset at the NE, erasure of data at the NE, a reconfiguration of the NE, power-cycling the hardware of the NE, reset and store of data/configurations at the NE, etc. The specific types of resets performed at the NE is not limited herein. A self-clear at an NE may refer to the situation in which an incident report is created based on an alarm at the NE, but the incident may no longer exist when a corrective action is attempted to be performed at or on the NE. That is to say, a self-clear refers to an unknown action taken at or by the NE that resulted in the automatic resolution of the incident, which at least in some cases may only be temporary. These resolutions may temporarily turn off the alarm and set the NE back into a functioning state, which indeed resolves the incident and closes the incident reports, but sometimes this is only temporarily. In other words, the incidents that were previously closed in response to a reset or a self-clear may occasionally arise again at the NE because the previous reset or self-clear may not have addressed the root cause of the incident.

Incidents that repeatedly occur after being temporarily corrected with a reset or a self-clear, but not truly resolved, may be considered chronic incidents, for which a simple reset or self-clear is not sufficient for correcting the root cause of the incident. Further investigation and action may be needed to truly resolve a chronic incident. Each time the incident occurs, a corresponding incident report may be created, and the temporary corrective action (e.g., the reset action) may be performed at the NE to close the incident report. For a chronic incident to be detected, the incident may have to occur a threshold number of times at the NE, or a threshold number of incident reports may have to be created for the NE in response to the same type of alarm within a predefined time range (e.g., the last 30 days).

For example, a first alarm may be triggered at an NE indicating a hardware failure at the NE, which may trigger the creation of a first incident report. In response to the first incident report, a NOC operator or an automated system may instruct a reset action to be performed at the NE, for example, an hour later. The next day, the first alarm may be triggered at the NE again indicating the same hardware failure. The alarm may trigger the creation of a second incident report. In response to the second incident report, the NOC operator or the automated system may instruct another reset action to be performed at the NE. Two days later, the first alarm may be triggered yet again at the NE indicating the same hardware failure occurring again at the NE. This alarm may trigger the creation of a third incident report. In response to the third incident report, the NOC operator or the automated system may instruct yet another reset action to be performed at the NE.

This repetitive reset action may continue to be performed at the NE in response to the same alarm without detection. In addition, the incident system may not be programmed to detect repetitive reset and self-clear actions made in response to the same alarm being triggered at the NE. In other words, the system may not be programmed to detect chronic incidents and notify the NOC of the chronic incidents to determine a resolution plan to address the underlying root cause of the chronic incidents. Moreover, the system may not be programmed to collect data regarding the chronic incidents, such that the data may be used to predict resolution plans for similar chronic incidents.

Therefore, the system as programmed may have several technical problems, which may result in repetitive failures, outages, and degraded services occurring at the RAN as a result of chronic incidents. The functioning of the NEs and/or the network impact of the NEs may be compromised each time an incident occurs at the NE, and when chronic incidents repeatedly occur at the NE without a true resolution, the NE is consistently and repeatedly compromised. Said another way, chronic undetected incidents at the NEs in the RAN may significantly decrease network capacity. The resources that are used to reset the NE in response to each iteration of the chronic incident also consumes a heavy load on the network.

The present disclosure teaches a technical solution to the foregoing technical problem related to network operations and maintenance by implementing methods and systems for chronic incident mitigation and resolution. The methods and systems for chronic incident mitigation and resolution disclosed herein may detect chronic incidents occurring at the NE before the chronic nature of the incident causes a significant negative impact to the network. By detecting chronic incidents and addressing the root cause of the chronic incidents, the embodiments disclosed herein prevent the repeated outages, failures, and degraded service that may occur when chronic incidents are repeatedly incurred at NEs, which thereby significantly increases the network capacity. The load on the network may also be significantly decreased by addressing chronic incidents in a timely manner eliminating the need to repeatedly forward multiple incident reports for the same chronic incident.

In an embodiment, the incident reporting application may begin by monitoring all alarms that have been triggered across NEs in the RAN based on alarm data stored at a data store in the network. The alarm data may store data related to the alarms triggered by the NEs in the RAN, for which a corresponding incident report may not have been generated and/or for which a corresponding incident report has not yet been closed (i.e., indicated as resolved). The alarm data may include, for example, the triggering incident, the time of the incident/alarm, an identification of the NE, a priority of the alarm, etc. Each alarm may be associated with different or similar incidents occurring at NEs in the RAN.

In an embodiment, the data store may also maintain a history of prior incident reports created based on prior alarms triggered at the NEs in the RAN, in which the prior incident reports may have already been closed. The history of prior incident reports may indicate incident data for each incident report, such as, for example, the NEs affected by the incident described in the incident report, the alarm that triggered the incident report, the action items (e.g., tasks) that were performed at the NE to resolve the incident, the performed action items that successfully resolved the incident, the performed action items that did not successfully resolve the incident, etc. For example, the history of prior incident reports may include, for each generated incident report, details regarding the alarm(s) that triggered the generation of the incident report. The history of prior incident reports may also indicate the corrective actions that were performed for each prior incident using resolution identifiers, which may be a value or code uniquely identifying one or more corrective actions performed to address and resolve the prior incidents.

The incident reporting application may generate an incident report describing an incident based on one or more of the alarms (sometimes referred to herein as the "current alarm") using the alarm data stored at the data store. When the incident reporting application is generating the incident report for an incident at an NE based on an alarm, the incident reporting application may also search through the history of prior incident reports of the NE. The searched prior incident reports may only include the prior incident reports created in response to alarms similar to the current alarm, which were triggered within a recent predefined time period (e.g., within the past 30 days). The incident reporting application may determine whether the history of prior incident reports of the NE indicates that at least a threshold number of prior incident reports were created within the predefined prior time period, in which the prior incident reports were generated based on a similar alarm, and in which the prior incident reports each indicate that the incident was "resolved" using a specific corrective action (e.g., a reset or a self-clear). The specific corrective action may be the same across each of the prior incidents or different across each of the prior incidents. When the incident reporting application determines that the history of prior incident reports of the NE includes at least a threshold number of prior incident reports meeting the aforementioned criteria, the incident reporting application may determine that the incident being described by the newly generated incident report is a chronic incident.

For example, suppose the incident reporting application is generating an incident report for a cell site based on an alarm triggered at the cell site, in which the alarm is triggered due to a fault or failure occurring at a firmware of the cell site. The incident reporting application may review the history of prior incident reports generated for the cell site to determine a quantity of incident reports that were created under the following conditions: (1) within a recent predefined time period (e.g., last X number of days), (2) based on alarms triggered due to faults or failures occurring at the firmware of the cell site, and (3) resolved using a consistent reset action (or a self-clear action). The incident reporting application may compare this quantity of prior incident reports with a threshold value, such that if the quantity of prior incident reports is greater than or equal to the threshold value, the incident reporting application may determine that the incident being described in the current incident report is chronic. For example, the threshold value may be any number ranging from two to six. For example, the threshold value may be three, such that if three or more incident reports were created for the NE based on these types of alarms triggered at the cell site within the past X number of days, and if these three or more incidents were "resolved" using a reset or self-clear, the incident may be considered a chronic incident.

When the incident reporting application determines that the incident being described is chronic, the incident reporting application may add a tag to the incident report to indicate that the incident being described is a chronic incident. The tag may be embodied in the incident report in various manners. For example, the tag may be descriptive text added to the incident report, stating that the incident is a chronic incident, which may be detected by other applications, systems, and personnel. As another example, the tag may be a flag or bit added to the incident report indicating that the incident being described is a chronic incident. As yet another example, the tag may be an information element added to the incident report, in which the information element includes a value identifying that the incident report describes a chronic incident. The information element may include other data describing the chronic attributes of the incident as well. For example, the information element may include details describing the prior incidents and times of the prior incidents that were analyzed to determine that this incident is chronic.

Therefore, the incident reporting application may create the incident report with information describing the incident and the tag indicating that the incident being described in the incident report is a chronic incident. The incident reporting application may transmit the incident report to the incident management application, which may be responsible for triaging all of the unresolved incident reports according to a priority and/or other factors. The incident management application may triage the incident report among other unresolved incident reports based on the tag, such that the incident reports with chronic tag may have a higher priority than the other unresolved incident reports. The incident reports having a higher priority may be sent for resolution before lower priority incident reports.

The incident management application may transmit the incident report to a processing entity to address and resolve the incident. The processing entity may be, for example, a NOC operator, a field technician, and/or an automated system. The processing entity may first perform a reset on the NE, to at least temporarily reset the NE to a proper functioning state. The processing entity may also determine one or more action items that may be performed to actually resolve the root cause of the chronic incident, and this may be performed immediately and/or in parallel while the NE has been temporarily reset. In other words, since the incident report was tagged as being chronic, the processing entity is made aware that a simple reset may not be sufficient to resolve the incident. Nevertheless, the reset may still be performed at the NE to keep the network functioning and available while the root cause of the chronic incident is being investigated and resolved, thereby preserving network capacity and increasing bandwidth during the interim.

For example, when the processing entity is a field technician, the field technician may manually reset the firmware of the cell site, and then further investigate a root cause behind the repetitive software failure at the cell site. After further investigation, the field technician may identify that the actual root cause of the chronic incident was that an outdated version of the firmware is being used at the cell site. The field technician may determine that the corrective actions for actually resolving this issue may be to update the firmware at the cell site (as opposed to simply resetting the cell site). The field technician may update the firmware at the cell site, and provide feedback data to the system. The feedback data may indicate details from the incident report (e.g., affected NE(s), alarm(s) that triggered the incident report, previous corrective actions taken to temporarily resolve chronic incident, etc.), and the corrective actions performed to actually resolve the underlying cause of the chronic incident. In this example, the feedback data may include the details from the incident and an indication that the chronic incident triggered based on repetitive alarms indicating a fault or failure occurring at a firmware of the cell site was resolved with a firmware update.

The incident management application may obtain the feedback data from the processing entities based on the processing and resolution of incidents being resolved, including chronic incidents, and store the feedback data in the data store. The feedback data may be stored in the data store in a history of incident resolutions. The history of incident resolutions may indicate the successful resolutions or corrective actions that actually resolved chronic incidents and the unsuccessful resolutions or corrective actions that failed to resolve the chronic incident (i.e., the incident kept occurring even after the performance of the unsuccessful resolution or corrective actions). The incident management application may use the history of incident resolutions to identify patterns and trends between certain types of chronic incidents and the successful resolutions that actually resolved the chronic incidents based on, for example, a machine learning model or other type of predictive model. The model may be trained using the history of incident resolutions and known outcomes, such that the data points and algorithms in the model may be used to make predictions about the optimal set of corrective actions to take to address and resolve a chronic incident For example, the incident reporting application may input information describing a determined chronic incident into the predictive model, which may use the identified patterns and trained algorithms to predict one or more corrective actions that may successfully resolve the chronic incident. The incident reporting application may add these corrective actions to the incident report. The incident reporting application may forward the incident report to the incident management application, and the incident management application may forward the incident report to a processing entity. When the processing entity is the automated system, the automated system may be programmed to automatically perform or instruct the performance of the corrective actions indicated in the incident report. For example, the automated system may transmit, to a cell site, an instruction to update the firmware at the cell site with a package including the updated firmware when the incident report indicates a firmware update as a predicted corrective action. In this way, the embodiments disclosed herein may completely automate the detection and full resolution of chronic incidents occurring within the RAN.

Therefore, as mentioned above, the embodiments of chronic incident mitigation and resolution disclosed herein significantly increase network capacity and reduce the load on the network. For example, by ultimately preventing chronic incidents such as outages, failures, faults, and other abnormalities in the RAN from reoccurring, the NEs in the RAN are enabled to continue operating normally, forwarding traffic as expected and providing services to customers as expected. This in turn prevents NEs in the RAN from crashing and prevents customers from experiencing the effects of the crashing, such as, for example, dropped calls and access failures. In addition, the embodiments disclosed herein enable the automation of more accurate resolution plans, as opposed to merely processing the NE through a series of pre-determined automated steps for resolution.

Turning now to FIG. 1, a communication network 100 is described. In an embodiment, the communication network 100 comprises a radio access network (RAN) 102, a plurality of operational support systems (OSSs) 104, a network 106, a cell site maintenance tracking system 108, an alarms configuration system 110, an automated alarms handling system 112 that executes an incident management application 114, a network operation center (NOC) dashboard system 116, an incident reporting application (or system) 118, and a data store 120. In an embodiment, communication network 100 may be a telecommunications carrier networking comprising the RAN 102.

The RAN 102 comprises a plurality of NEs, such as, for example, cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router (CSR) that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the network 100.

The cell site maintenance tracking system 108 is a system implemented by one or more computers. Computers are discussed further hereinafter. The cell site maintenance tracking system 108 is used to track maintenance activities on NEs (e.g., cell site equipment, routers, gateways, and other network equipment). When a NE is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define an alarm configuration rules for when an alarm leads to automatic generation of an incident report, as described herein.

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. In an embodiment, the NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

The incident reporting application (or system) 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the network 100, as described further hereinafter. Incident reports may be referred to in some contexts or by other communication service providers as tickets or trouble tickets.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

In an embodiment, the incident reporting application 118 and the incident management application 114 in the communication network 100 may be enhanced to perform the chronic incident mitigation and resolution methods described herein. The alarm configuration system 110 may also be enhanced to add new rules related to the management of chronic incidents. As mentioned above, the alarm configuration system 110 may define alarm configuration rules with instructions and parameters related to the the generation of an incident report. The alarm configuration rules may include a new alarm configuration rule, instructing the incident reporting application 118 to perform a chronic incident verification for each newly generated incident report. The chronic incident verification may be performed, for example, based on the steps described below with reference to method 300 of FIG. 3 and method 400 of FIG. 4. The new alarm configuration rule may also include an instruction for the incident reporting application 118 to add a tag to the incident report when it is determined that the incident being described in an incident report is a chronic incident.

The data store 120 may store particular types of data to facilitate chronic incident mitigation and resolution according to the embodiments disclosed herein. As shown in FIG. 1, the data store 120 may store the data describing the unresolved alarms 143 triggered by NEs in the RAN 102, for which a corresponding incident report has not yet been created. The unresolved alarms 143 may include information describing the incident that triggered the alarm 143/prior alarm 153 (e.g., type of incident, time of incident, location of incident, affected NE(s), etc.). The data store 120 may also store a history of prior incident reports 133. For example, the data store 120 may include a database storing data describing all of the prior incident reports 133 created for the NEs in the RAN 102. The database of prior incident reports 133 may be subdivided by each NE or each category of NEs. For example, there may be one subdivision for the prior incident reports 133 related to a first NE, another subdivision for the prior incident reports 133 related to a second NE, and so on. Alternatively, the NEs may be grouped into categories based on an attribute of the NEs, such as, for example, a type of the NE or a location of the NEs. In this case, there may be one subdivision for the prior incident reports 133 related to a first category of NEs, another subdivision for the prior incident reports 133 related to a second category of NEs, and so on.

The database of prior incident reports 133 may also include an entry for each prior incident report 133, in which each entry may indicate information describing the incident and the conditions that triggered creation of the prior incident report 133. For example, an entry describing the prior incident report 133 may include a time 150 of the incident or a time 150 of the related prior alarm 153, an identification of the prior alarm 153, identifications of the NE(s) 156 affected by the prior incident triggering the creation of the prior incident reports 133, and one or more resolution identifiers 159 identifying corrective actions taken to address and resolve the prior incident. The time 150 may include a date and a time at which the prior incident occurred or the prior alarm 153 was triggered. The identification of the prior alarm 153 may include, for example, an identifier identifying the prior alarm 153 and/or a description indicating the type of incident signaled by the prior alarm 153. The resolution identifier 159 may be a value or code uniquely identifying the corrective actions performed to address and resolve the prior incident reports 133. For example, the resolution identifier 159 may include one code indicating that the prior incident reports 133 was (temporarily) resolved with a reset, or the resolution identifier 159 may include another code indicating that the prior incident reports 133 was (temporarily) resolved with a self-clear. The resolution identifier 159 may include yet another code indicating that other types of corrective action steps were taken to address and resolve the prior incident reports 133.

The incident reporting application 118 may use the database of prior incident reports 133 to determine whether to add a tag to a newly created incident report to signal that the incident being described is a chronic incident, which may be temporarily mitigated by resetting the NE again, but also further investigated to perform additional corrective actions. The incident reporting application 118 may generate new incident reports in response to a current alarm (from the unresolved alarms 143) based on the history of prior incident reports 133 of the NE. The incident reporting application 118 may first obtain all of the prior incident reports 133 related to the NE within a recent predetermined time period (e.g., the last 30 days).

The incident reporting application 118 may then obtain the prior incident reports 133 that were triggered based on a prior alarm 153 similar to the current alarm. In an embodiment, the incident reporting application 118 may compare an identifier of the current alarm with an identifier of the prior alarm 153, such that if the identifiers are the same, then the prior incident reports 133 associated with the prior alarm 153 may be used in the chronic incident determination. In another embodiment, the incident reporting application 118 may compare the description of the current alarm with the description of the prior alarm 153, such that if the descriptions are substantially similar or address similar types of incidents, then the prior incident reports 133 associated with the prior alarm 153 may be used in the chronic incident determination.

After obtaining the prior incident reports 133 within the predefined time period that were based on alarms similar to the current alarm, the incident reporting application 118 may then obtain the prior incident reports 133 that have the same resolution identifier 159. For example, there may be five prior incident reports 133 that each include a resolution identifier 159 identifying that the incident was resolved with a self-clear. Alternatively, the five prior incident reports 133 may each include a resolution identifier 159 identifying that the incident was resolved with a specific type of reset (e.g., reboot of the NE). The incident reporting application 118 may then compare a quantity of these prior incident reports 133 with a threshold value to determine whether the incident being described in the current incident report is a chronic incident. The threshold value may be a predefined value indicated in the alarm configuration rules. For example, the threshold value may be three. In this case, since the quantity of prior incident reports 133 within the predefined time period that were only temporarily resolved with a repeated resolution plan identified by the resolution identifier 159 is greater than the threshold value, the incident reporting application 118 may determine that the incident report is describing a chronic incident. In this case, the incident reporting application 118 may add a tag to the current incident report, as further described below with reference to FIG. 2.

The incident reporting application 118 may then transmit the incident report to the incident management application 114. The incident management application 114 may triage the incident report based on, for example, a priority of the unresolved incident reports in the system. The incident reports tagged as being chronic (i.e., including a tag identifying a chronic incident) may be assigned a higher priority than the other unresolved incident reports.

The incident reporting application 118 may then forward the incident report to a processing entity to address and resolve the incident report. In some cases, the processing entity may be a NOC operator or a field technician, who may manually investigate the chronic incident to determine a root cause of the chronic incident, and determine an actual resolution to the chronic incident. The NOC operator and/or the field technician may then provide feedback data 170 describing the corrective actions that addressed and resolved the root cause of the chronic incident back to the incident management application 114. The incident management application 114 may extract and store the feedback data 170 into a database describing a history of incident resolutions 140, which may be used to predict corrective actions that may be performed to resolve future chronic incidents.

To this end, the data store 120 may store the history of incident resolutions 140 as a separate database. For example, the history of incident resolutions 140 may describe all of the prior incident reports 133 and the corrective actions and/or resolution plans that were taken (successful or not) in an attempt to resolve the underlying prior incident. The history of incident resolutions 140 may be subdivided by each NE or each category of NEs. The history of incident resolutions 140 may also be subdivided based on whether the prior incident was a chronic incident or not.

The history of incident resolutions 140 may include an entry for each prior incident, in which each entry may indicate information describing the prior incident and the corrective actions taken in an attempt to address and resolve the incident. For example, an entry may include identifications of the NE(s) 156 affected by the prior incident, an identification of the prior alarm 153 triggered by the prior incident, and resolution identifiers 159 indicating the prior corrective actions taken to address and potentially resolve the prior incident. The resolution identifiers 159 indicating the prior corrective actions may include information describing both successful resolutions or corrective actions actually resolved the prior incidents and unsuccessful resolutions or corrective actions failed to resolve the prior incident (i.e., the incident kept occurring even after the performance of the unsuccessful resolution or corrective actions). The resolution identifiers 159 of the prior corrective actions may be indicated using an identifier or code identifying a type of corrective action. The prior corrective actions may also be indicated in the resolution identifiers 159 using descriptive text or other types of information elements.

The incident management application 114 may use the history of incident resolutions 140 to identify a pattern between certain types of chronic incidents and the successful resolutions that may be used to resolve the chronic incidents based on, for example, a predictive model 180. The predictive model 180 may be a computational system (e.g., including both software and hardware components) designed to make predictions or forecasts based on patterns or trends learned from historical data. The predictive model 180 may be implemented using software (e.g., algorithms, logic, and code) stored across memories, for example, in the data store 120. The underlying hardware of the data store 120 and the computer system executing the incident reporting application 118 may provide the computational resources for execution of the predictive model 180. For example, the predictive model 180 may be a type of machine learning model that leverages algorithms and statistical techniques to analyze input features, identify patterns, and generate predictions regarding potential corrective actions to perform to actually resolve a chronic incident. The predictive model 180 may be implemented as one or more different types of models using, for example, linear regression, decision trees, support vector machines, neural networks, or ensemble methods. It should be appreciated that any type of predictive model may be used, and the underlying algorithms, computations, and machine learning libraries used by the predictive model 180 should not be limited herein. The predictive model 180 may be trained using the history of incident resolutions 140 and known outcomes, such that the data points and algorithms in the predictive model 180 may be used to make predictions about the optimal set of corrective actions to perform in an attempt to successfully resolve a chronic incident The incident reporting application 118 may input data describing a determined chronic incident into the predictive model 180, which may use the identified patterns and trained algorithms to predict one or more action items that may successfully resolve the chronic incident. The incident reporting application 118 may add these action items to the incident report. The incident reporting application 118 may forward the incident report to the incident management application 114, and the incident management application 114 may forward the incident report to a processing entity. When the processing entity is the automated system, the automated system may be programmed to automatically perform or instruct the performance of the action items indicated in the incident report.

Figure 2:
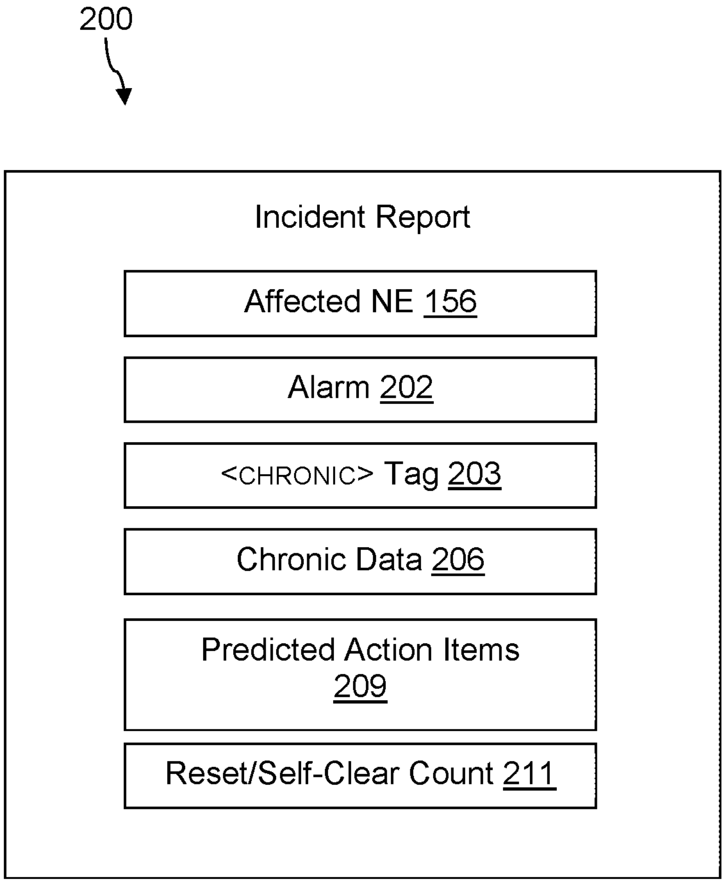
FIG. 2 is a block diagram illustrating an example incident report generated in the communication network of FIG. 1 according to various embodiments of the disclosure.

Referring now to FIG. 2, a diagram illustrating an example incident report 200 is described. The incident reporting application 118 may generate the incident report 200 based on an alarm 143 stored at the data store 120. The incident reporting application 118 may perform the methods described herein (e.g., methods 300 and 400) to determine that the incident to be described in the incident report 200 is a chronic incident, and then generate the incident report 200 accordingly.

The generated incident report 200 may include an identification of the one or more NEs 156 affected by the chronic incident. The identification of the NEs 156 may include an address or identifier of the NEs 156 that are experiencing the incident, in other words, experiencing a failure, fault, abnormality, or degraded service as a result of the incident. The generated incident report 200 may also include an identification of the alarm 202 (i.e., the current alarm) that was triggered at the NEs 156 by the incident. The identification of the alarm 202 may include an identifier uniquely identifying the alarm or a description of the types of incidents that trigger the alarm 202.

The incident report 200 may also include a tag 203 indicating that the incident report 200 describes a chronic incident. The tag 203 may be embodied in the incident report 200 in various different manners. For example, the tag 203 may be descriptive text added to the incident report 200, in which the descriptive text states that the incident is a chronic incident. In this way, the processing entity receiving the incident report 200 may determine that the incident report 200 is related to a chronic incident, and thus may be assigned a higher priority. When the processing entity is an automated system, the processing entity may use a text recognition algorithm, such as, for example, natural language processing, to decipher the text in the tag 203 of the incident report 200 stating that the incident report 200 details a chronic incident.

As another example, the tag 203 may be a flag or bit added to the incident report 200, indicating that the incident being described is a chronic incident. The processing entity may have knowledge of various predefined flags or bits including the flag or bit indicating a chronic incident, such that the processing entity may determine that the incident report 200 is related to a chronic incident when the flag or bit in the incident report 200 is set to a known predefined value. When the processing entity is an automated system, the automated system may be programmed to detect the flag or bit in the incident report 200 and determine whether the incident report 200 describes a chronic incident based on the flag or bit.

As yet another example, the tag 203 may be an information element added to the incident report 200, in which the information element includes a value identifying that the incident report 200 describes a chronic incident. The information element may also include other chronic data 206 describing the chronic nature of the incident. For example, the chronic data 206 may include information describing the prior incidents and times of the prior incidents that were analyzed to determine this incident as being chronic. The processing entity may have knowledge of various values that may be carried in the information element that may signal a chronic incident, such that the processing entity may determine that the incident report 200 is related to a chronic incident when certain values are carried in the information element. When the processing entity is an automated system, the automated system may be programmed to detect the values in the information element and determine whether the incident report 200 describes a chronic incident based on the values. The automated system may also be programmed to detect the chronic data 206 in the information element, which may be used for other purposes.

The incident report 200 may also include one or more predicted action items 209. The predicted action items 209 refer to one or more tasks or corrective actions, which may be performed to address and actually resolve (as opposed to temporarily resolve) a chronic incident. As described above with reference to FIG. 1, the incident reporting application 118 may use a predictive model 180 to determine the predicted action items 209 based on patterns of known chronic incidents and corresponding known, successfully resolution plans/corrective actions taken to actually resolve the chronic incidents.

The prediction action items 209 may be indicated in the incident report 200 using one or more resolution identifiers 159. A resolution identifier 159 may be an identifier or code identifying a type of predicted corrective action or task. The resolution identifier 159 may also or otherwise include descriptive text or other types of information elements. The processing entity may have knowledge of various resolution identifiers 159 that may be used to identify the corrective actions or tasks in the prediction action items 209, such that the processing entity may determine corrective actions or tasks to perform to attempt to actually resolve the chronic incident. When the processing entity is an automated system, the automated system may be programmed to detect the resolution identifiers 159 and then automatically perform or instruct another entity, computer, or person to perform the corrective actions or tasks identified by the resolution identifiers 159.

In some cases, a reset/self-clear count 211 may be added to the incident report 200 when, for example, a quantity of prior incident reports 133 meeting the aforementioned criteria is not greater than or equal to a threshold value. When the reset/self-clear count 211 refers to a reset count 211, the reset count 211 may indicate a quantity of prior incident reports 133, associated with the same NE 156 and the same type of alarm 202 within a recent predefined period of time, that were resolved with a reset action. When the reset/self-clear count 211 refers to a self-clear count 211, the self-clear count 211 may indicate a quantity of prior incident reports 133, associated with the same NE 156 and the same type of alarm 202 within a recent predefined period of time, that were resolved with a self-clear action. The incident reporting application 118 may search through the prior incident reports 133 of the NE with the similar alarm 202 within the predefined period of time to determine the reset/self-clear count 211 for the NE 156 and the alarm 202, which may be 0 if neither action has been performed at the NE based on the alarm 202. When the reset/self-clear count 211 is determined to be 0 based on the history of prior incident reports 133, the incident reporting application 118 may add the reset/self-clear count 211 to the incident report 200 and set the reset/self-clear count 211 to 1. The incident reporting application 118 may also store the reset/self-clear count 211 at the data store 120, such that the incident reporting application 118 may access the reset/self-clear count 211 when creating additional incident reports 200 for the NE based on similar alarms 202. The incident reporting application 118 may obtain the reset/self-clear count 211 from the data store 120 each time a new incident report 200 is being generated in association with the same NE 156 and the same type of alarm 202 within the recent predefined period of time, increment the reset/self-clear count 211, and add the incremented reset/self-clear count 211 to the incident report 200.

Figure 3:
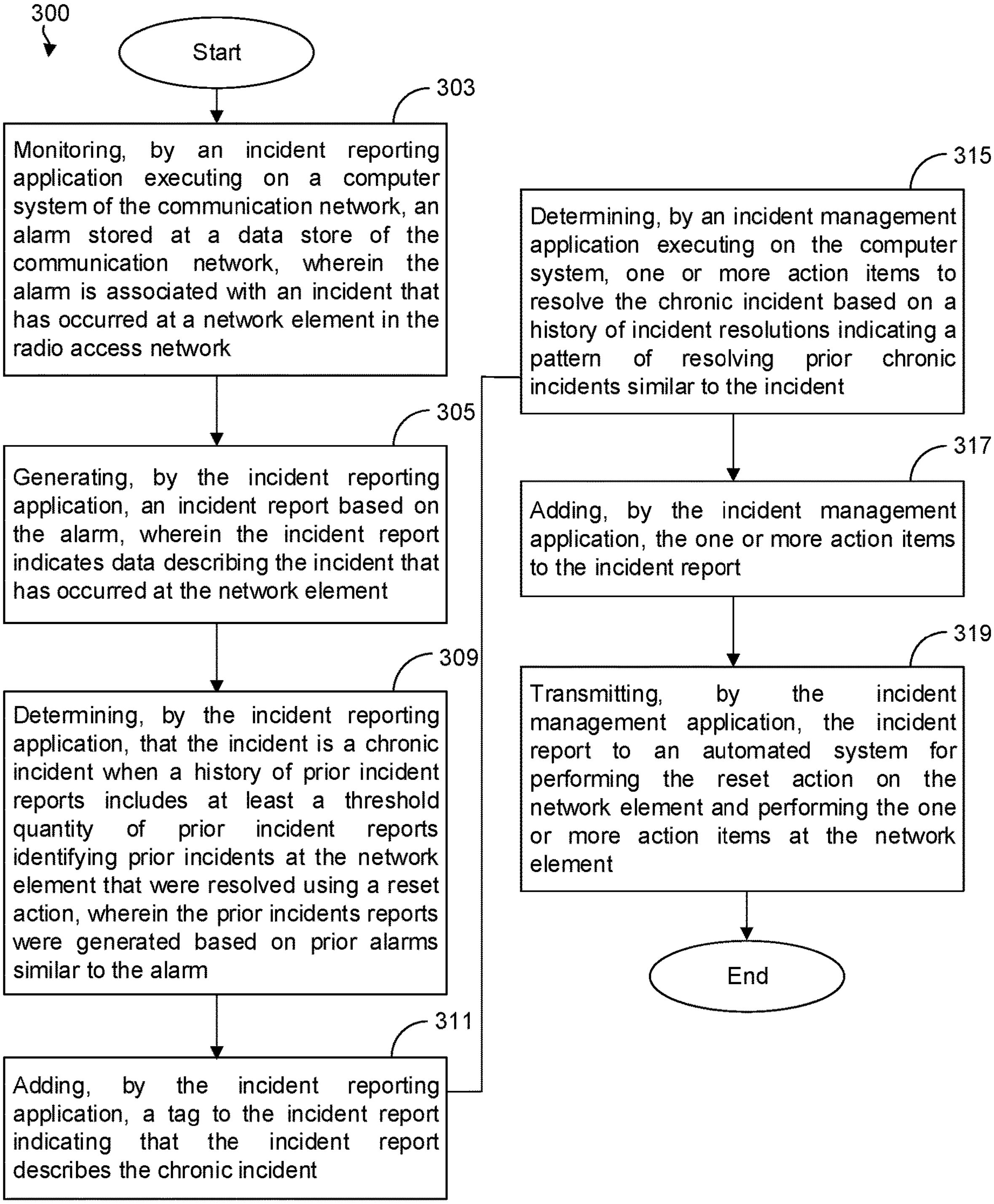
FIG. 3 is a flow chart of a method according to an embodiment of the disclosure.

Turning now to FIG. 3, a method 300 is described. Method 300 may be performed by the incident reporting application 118 and the incident management application 114 of the communication network 100. Method 300 may be performed based on one or more alarms 143 stored at the data store 120, for which an incident report 200 may not have yet been created.

At step 303, method 300 comprises monitoring, by the incident reporting application 118 executing on a computer system of the communication network 100, an alarm 202 stored at a data store 120 of the communication network 100. The alarm 202 is associated with an incident that has occurred at an NE 156 in the RAN 102. At step 305, method 300 comprises generating, by the incident reporting application 118, an incident report 200 based on the alarm 202, in which the incident report 200 indicates data describing the incident that has occurred at the NE 156. At step 309, method 300 comprises determining, by the incident reporting application 118, that the incident is a chronic incident when a history of prior incident reports 133 includes at least a threshold quantity of prior incident reports 133 identifying prior incidents at the NE 156 that were resolved using a reset action, wherein the prior incidents reports 133 were generated based on the prior alarms 153 similar to the alarm 202.

At step 311, method 300 comprises adding, by the incident reporting application 118, a tag 203 to the incident report 200 indicating that the incident report 200 describes the chronic incident. At step 315, method 300 comprises determining, by an incident management application 114 executing on the computer system, one or more action items 209 to resolve the chronic incident based on a history of incident resolutions 140 indicating a pattern of resolving prior chronic incidents similar to the incident. At step 317, method 300 comprises adding, by the incident management application 114, the one or more action items 209 to the incident report 200. At step 319, method 300 comprises transmitting, by the incident management application 114, the incident report 200 to an automated system for performing the reset action on the NE 156 and performing the one or more action items 209 at the NE 156.

Method 300 may comprise other attributes and steps not otherwise shown in the flowchart of FIG. 3. In an embodiment, the incident report 200 is generated based on an alarm configuration rule, in which the alarm configuration rule includes an instruction to add the tag 203 to the incident report 200 when the incident report describes different types of chronic incidents. In an embodiment, method 300 comprises obtaining, by the incident reporting application 118, the history of prior incident reports 133 associated with the NE 156, in which the history of prior incident reports 133 includes data associated with a plurality of prior incident reports 133 based on a plurality of prior alarms 153 triggered at the NE 156. In an embodiment, the tag 203 is a flag added to the incident report 200. In an embodiment, the tag 203 comprises descriptive text added to the incident report 200, in which the descriptive text indicates that the incident is a chronic incident. In an embodiment, the tag 203 is an information element added to the incident report 200, in which the information element comprises a value indicating that the incident report 200 is describing the chronic incident. In an embodiment, method 300 comprises transmitting, by the incident reporting application 118, the incident report 200 to the incident management application 114 after adding the tag 203 to the incident report 200, and triaging, by the incident management application 114, the incident report 200 among a plurality of other unresolved incident reports 200 according to a priority of the incident report 200, in which the incident report 200 has a higher priority than the other unresolved incident reports 200. In an embodiment, method 300 comprises transmitting, by the incident reporting application 118, the incident report 200 to the incident management application 114 after adding the tag 203 to the incident report 200, transmitting, by the incident management application 114, the incident report 200 to the automated system, performing, by the automated system, the reset action on the NE 156, and performing, by the automated system, the one or more action items 209 on the NE 156 after performing the reset action on the NE 156. In an embodiment, method 300 comprises determining, by the incident reporting application 118, the pattern of resolving the prior chronic incidents similar to the incident based on the history of incident resolutions 140 stored at the data store, in which the history of incident resolutions 140 indicates prior corrective actions 165 performed to resolve other prior alarms 152 in the RAN, wherein the other prior alarms 153 are similar to the alarm 202. In an embodiment, wherein when the history of incident reports 133 does not include at least the threshold quantity of the prior incident reports 133 identifying the prior incidents at the NE 156 that were resolved using the reset action, the method 300 further comprises adding, by the incident reporting application 118, a reset count set to 0 to the incident report 200, or incrementing, by the incident reporting application 118, the reset count and adding the reset count to the incident report 200, in which the reset count indicates a quantity of the prior incident reports 133 identifying the prior incidents at the NE 156 that were resolved using the reset action.

Figure 4:
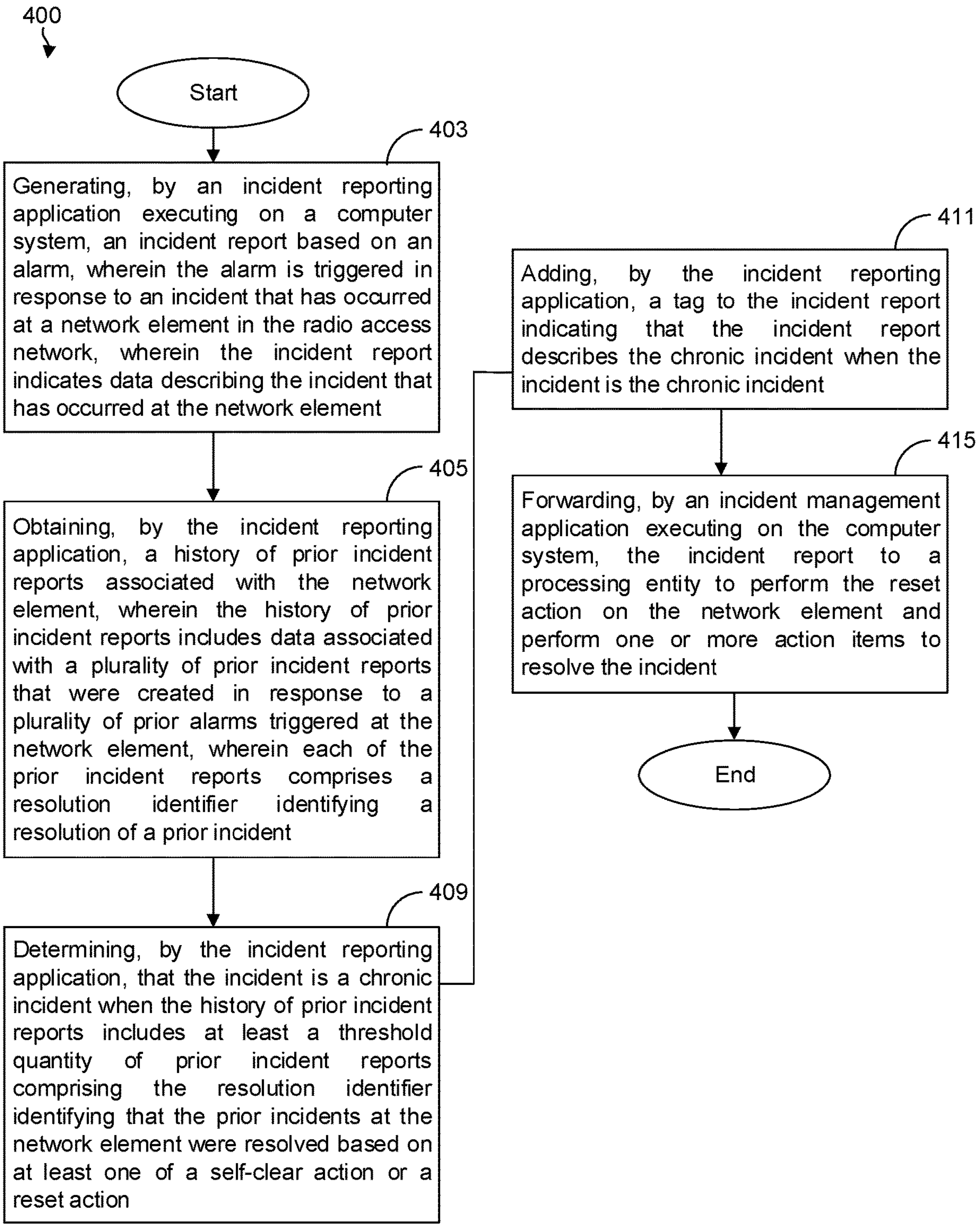
FIG. 4 is a flow chart of another method according to an embodiment of the disclosure.

Turning now to FIG. 4, a method 400 is described. Method 400 may be performed by the incident reporting application 118 and the incident management application 114 of the communication network 100. Method 400 may be performed based on one or more alarms 143 stored at the data store 120, for which an incident report 200 may not have yet been created.

At step 403, method 400 comprises generating, by the incident reporting application 118, an incident report 200 based on an alarm 202, in which the alarm 202 is triggered in response to an incident that has occurred at a NE 156 in the RAN 102. The incident report 200 indicates data describing the incident that has occurred at the NE 156. At step 405, method 400 comprises obtaining, by the incident reporting application 118, a history of prior incident reports 113 associated with the NE 156, in which the history of prior incident reports 113 includes data associated with a plurality of prior incident reports 133 that were created in response to a plurality of prior alarms 153 triggered at the NE 156. Each of the prior incident reports 133 comprises a resolution identifier 159 identifying a resolution of a prior incident.

At step 409, method 400 comprises determining, by the incident reporting application 118, that the incident is a chronic incident when the history of prior incident reports 133 includes at least a threshold quantity of prior incident reports 133 comprising the resolution identifier 159 identifying that the prior incidents at the NE 156 were resolved based on at least one of a self-clear action or a reset action. At step 411, method 400 comprises adding, by the incident reporting application 118, a tag to the incident report 200 indicating that the incident report 200 describes the chronic incident when the incident is the chronic incident. At step 415, method 400 comprise forwarding, by an incident management application 114 executing on the computer system, the incident report 200 to a processing entity to perform the reset action on the NE and perform one or more action items to resolve the incident.

Method 400 may comprise other attributes and steps not otherwise shown in the flowchart of FIG. 4. In an embodiment, method 400 may further comprise transmitting, by the incident reporting application 118, the incident report 200 to the incident management application 114, and transmitting, by the incident management application 114, the incident report 200 to the processing entity, in which the processing entity is a network operations center (NOC) operator, a field technician, or an automated system. In an embodiment, the threshold quantity of prior incident reports is three. In an embodiment, the incident report is generated based on an alarm configuration rule, in which the alarm configuration rule includes an instruction to add the tag 203 to the incident report 200 when the incident report describes different types of chronic incidents. In an embodiment, the tag 203 comprises a flag, descriptive text, or an information element. In an embodiment, the method 400 comprises determining, by the incident reporting application 118 based on a predictive model 180, one or more predicted action items 209 to resolve the chronic incident, and adding, by the incident reporting application 118, the one or more predicted action items 209 to the incident report 200.

Figure 5A:
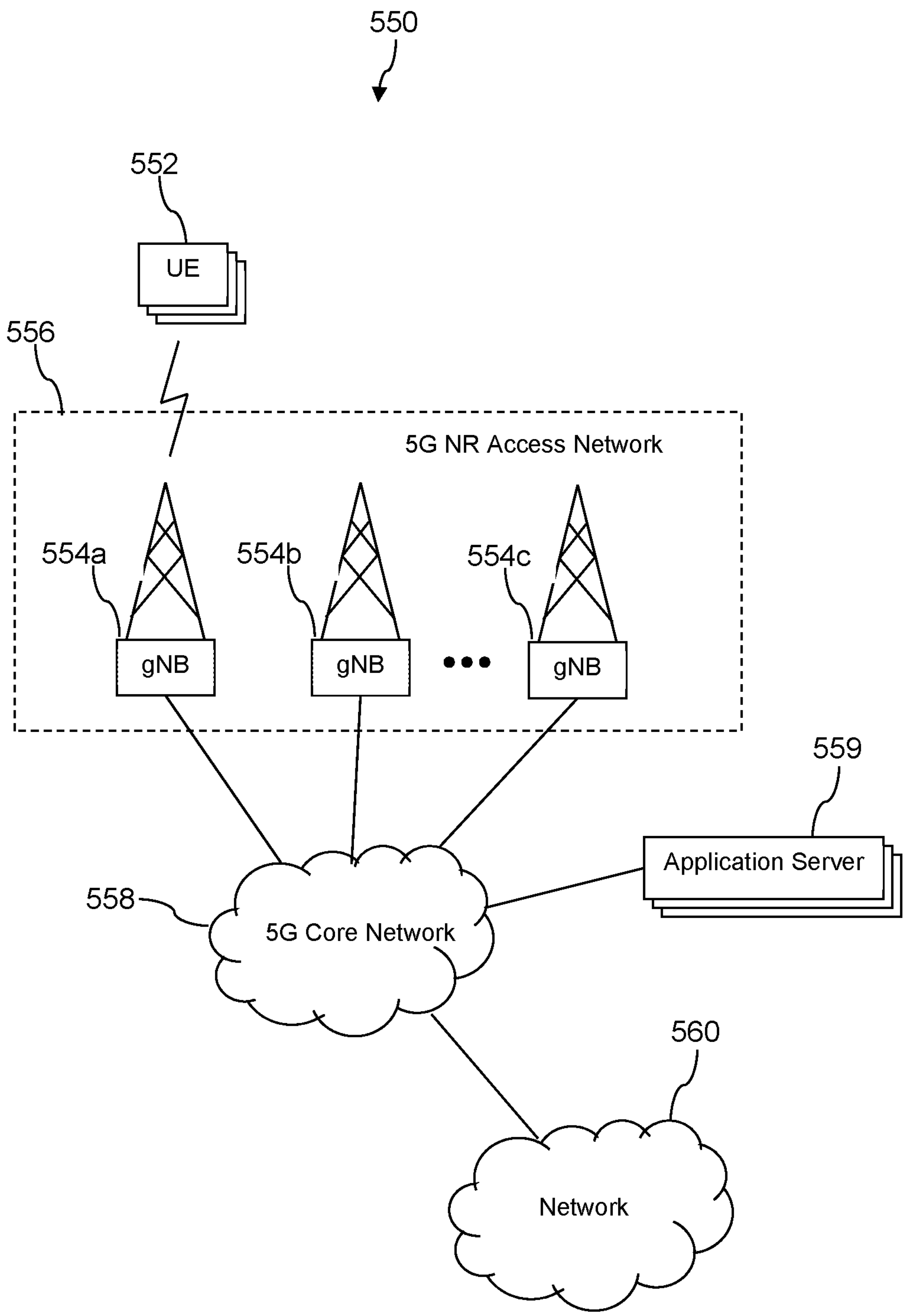
FIG. 5A and FIG. 5B are block diagrams of a 5G network according to an embodiment of the disclosure.

Turning now to FIG. 5A, an exemplary communication system 550 is described, similar to the communication network 100. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
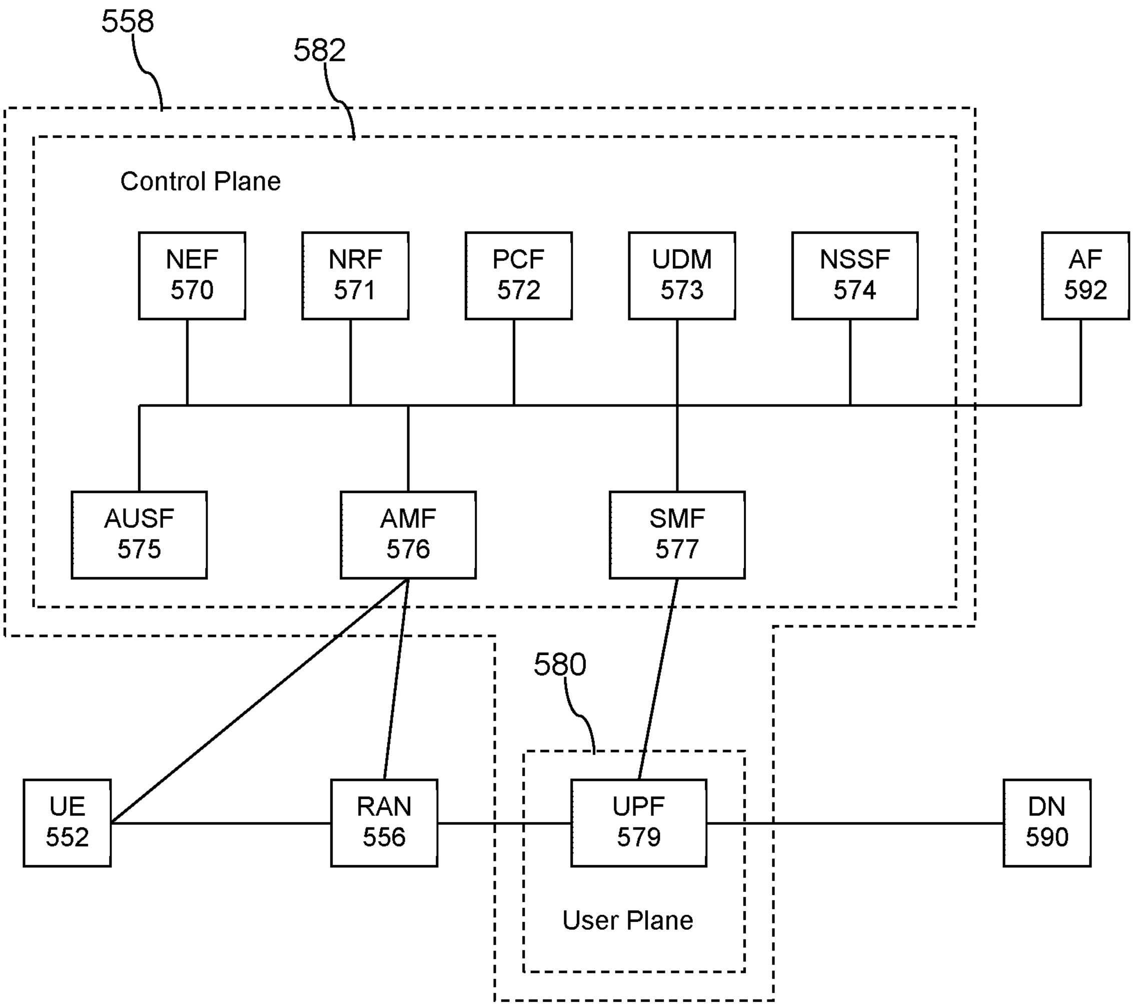

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
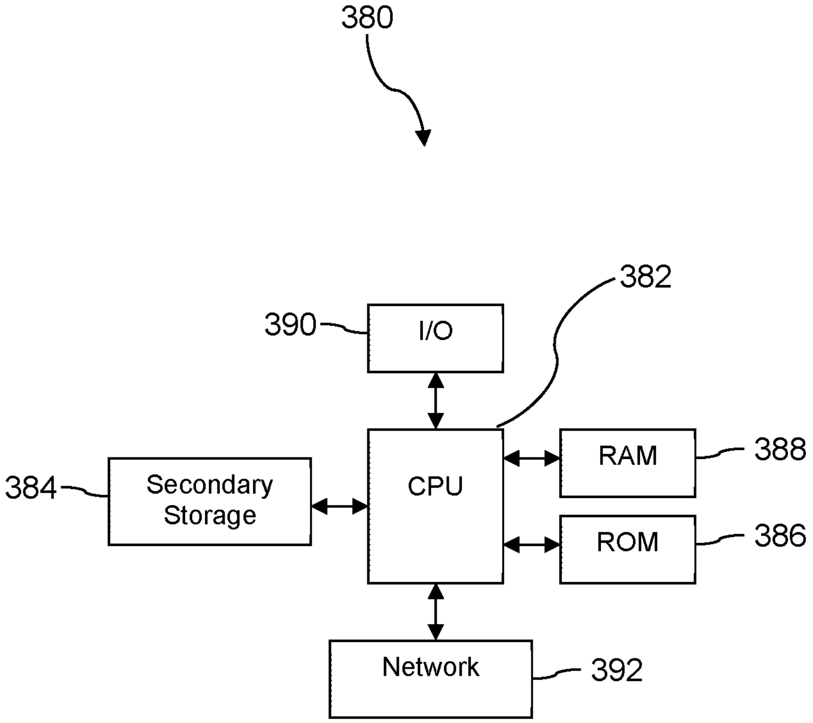
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing and resolving chronic incidents occurring in a radio access network of the communication network, wherein the method comprises:

generating, by an incident reporting application executing on a computer system, an incident report based on an alarm, wherein the alarm is triggered in response to an incident that has occurred at a network element in the radio access network, wherein the incident report indicates data describing the incident that has occurred at the network element;

obtaining, by the incident reporting application, a history of prior incident reports associated with the network element, wherein the history of prior incident reports includes data associated with a plurality of prior incident reports that were created in response to a plurality of prior alarms triggered at the network element, wherein each of the prior incident reports comprises a resolution identifier identifying a resolution of a prior incident;

determining, by the incident reporting application, that the incident is a chronic incident when the history of prior incident reports includes at least a threshold quantity of prior incident reports comprising the resolution identifier identifying that the prior incidents at the network element were resolved based on at least one of a self-clear action or a reset action, wherein the self-clear action comprises an automatic resolution of the prior incident at the network element without an identified corrective action being performed on the network element, and wherein the reset action comprises a restart of the network element without resolving an underlying root cause of the prior incident;

adding, by the incident reporting application, a tag to the incident report indicating that the incident report describes the chronic incident when the incident is the chronic incident; and forwarding, by an incident management application executing on the computer system, the incident report to a processing entity to perform the reset action on the network element and perform one or more action items to resolve the incident.

2. The method of claim 1, further comprising:

transmitting, by the incident reporting application, the incident report to the incident management application; and transmitting, by the incident management application, the incident report to the processing entity, wherein the processing entity is a network operations center (NOC) operator, a field technician, or an automated system.

3. The method of claim 1, wherein the threshold quantity of prior incident reports is three.

4. The method of claim 1, wherein the incident report is generated based on an alarm configuration rule, wherein the alarm configuration rule includes an instruction to add the tag to the incident report when the incident report describes different types of chronic incidents.

5. The method of claim 1, wherein the tag comprises a flag, descriptive text, or an information element.

6. The method of claim 1, further comprising:

determining, by the incident reporting application based on a predictive model, one or more predicted action items to resolve the chronic incident; and adding, by the incident reporting application, the one or more predicted action items to the incident report.

7. A communications network implemented in a network comprising a radio access network, wherein the communications network comprises:

an incident reporting application executing on a computer system in the communication network, wherein the incident reporting application is configured to:

generate an incident report based on an alarm indicated in a data store, wherein the alarm is triggered in response to an incident that has occurred at a network element in the radio access network, wherein the incident report indicates data describing the incident that has occurred at the network element;

obtain a history of incident reports associated with the network element, wherein the history of prior incident reports includes data associated with a plurality of prior incident reports created based on a plurality of prior alarms triggered at the network element, wherein each of the prior incident reports comprises a resolution identifier identifying a resolution of a prior incident;

determine that the incident is a chronic incident when the history of prior incident reports includes at least a threshold quantity of prior incident reports comprising the resolution identifier identifying that the prior incidents at the network element were resolved based on a self-clear, wherein the self-clear comprises an automatic resolution of the prior incident at the network element without an identified corrective action being performed on the network element; and add a tag to the incident report indicating that the incident report describes the chronic incident when the incident is the chronic incident; and an incident management application executing on the computer system, wherein the incident management application is configured to forward the incident report to a processing entity to perform a reset action on the network element and perform one or more action items to resolve the incident.

8. The communications network of claim 7, wherein the threshold quantity of prior incident reports is three.

9. The communications network of claim 7, wherein the incident report is generated based on an alarm configuration rule, wherein the alarm configuration rule includes an instruction to add the tag to the incident report when the incident report describes different types of chronic incidents.

10. The communications network of claim 7, wherein the tag comprises a flag, descriptive text, or an information element.

11. The communications network of claim 7, wherein the incident reporting application is further configured to transmit the incident report to the incident management application after adding the tag to the incident report, and wherein the incident management application is further configured to triage the incident report among a plurality of other unresolved incident reports according to a priority of the incident report, wherein the incident report has a higher priority than the other unresolved incident reports.

12. A method for managing and resolving chronic incidents occurring in a radio access network of a communication network, wherein the method comprises:

monitoring, by an incident reporting application executing on a computer system of the communication network, an alarm stored at a data store of the communication network, wherein the alarm is associated with an incident that has occurred at a network element in the radio access network;

generating, by the incident reporting application, an incident report based on the alarm, wherein the incident report indicates data describing the incident that has occurred at the network element;

determining, by the incident reporting application, that the incident is a chronic incident when a history of prior incident reports includes at least a threshold quantity of prior incident reports identifying prior incidents at the network element that were resolved using a reset action, wherein the reset action comprises a restart of the network element without resolving an underlying root cause of the prior incident, wherein the prior incidents reports were generated based on prior alarms similar to the alarm;

adding, by the incident reporting application, a tag to the incident report indicating that the incident report describes the chronic incident;

determining, by an incident management application executing on the computer system, one or more action items to resolve the chronic incident based on a history of incident resolutions indicating a pattern of resolving prior chronic incidents similar to the incident;

adding, by the incident management application, the one or more action items to the incident report; and transmitting, by the incident management application, the incident report to an automated system for performing the reset action on the network element and performing the one or more action items at the network element.

13. The method of claim 12, wherein the incident report is generated based on an alarm configuration rule, wherein the alarm configuration rule includes an instruction to add the tag to the incident report when the incident report describes different types of chronic incidents.

14. The method of claim 12, wherein the tag is a flag added to the incident report.

15. The method of claim 12, wherein the tag comprises descriptive text added to the incident report, wherein the descriptive text indicates that the incident is a chronic incident.

16. The method of claim 12, wherein the tag is an information element added to the incident report, wherein the information element comprises a value indicating that the incident report is describing the chronic incident.

17. The method of claim 12, further comprising:

transmitting, by the incident reporting application, the incident report to the incident management application after adding the tag to the incident report; and triaging, by the incident management application, the incident report among a plurality of other unresolved incident reports according to a priority of the incident report, wherein the incident report has a higher priority than the other unresolved incident reports.

18. The method of claim 12, further comprising:

transmitting, by the incident reporting application, the incident report to the incident management application after adding the tag to the incident report;

transmitting, by the incident management application, the incident report to the automated system;

performing, by the automated system, the reset action on the network element; and performing, by the automated system, the one or more action items on the network element after performing the reset action on the network element.

19. The method of claim 12, further comprising determining, by the incident reporting application, the pattern of resolving the prior chronic incidents similar to the incident based on a history of incident resolutions stored at the data store, wherein the history of incident resolutions indicates prior actions performed to resolve other alarms in the radio access network, wherein the other alarms are similar to the alarm.

20. The method of claim 12, wherein when the history of incident reports does not include at least the threshold quantity of the prior incident reports identifying the prior incidents at the network element that were resolved using the reset action, the method further comprises:

adding, by the incident reporting application, a reset count set to 0 to the incident report; or incrementing, by the incident reporting application, the reset count and adding the reset count to the incident report, wherein the reset count indicates a quantity of the prior incident reports identifying the prior incidents at the network element that were resolved using the reset action.

* * * * *